United States Patent [19]
Crotty et al.

[11] Patent Number: 5,922,800
[45] Date of Patent: Jul. 13, 1999

[54] BLENDS OF CALCIUM CARBONATE AND LLDPE

[75] Inventors: Vincent J. Crotty, Wall; Vaseem Firdaus, Somerset; Frank Herbert Puterbaugh, Phillipsburg, all of N.J.

[73] Assignee: Mobil Oil Corporation, Fairfax, Va.

[21] Appl. No.: 08/381,024

[22] Filed: Jan. 31, 1995

Related U.S. Application Data

[63] ntinuation of application No. 08/153,852, Nov. 18, 1993., abandoned

[51] Int. Cl.$^6$ .............................. C08K 3/20; C08L 63/00
[52] U.S. Cl. .................................. 524/425; 524/1; 524/8; 524/427
[58] Field of Search ................................... 524/1, 8, 425, 524/427

[56] References Cited

U.S. PATENT DOCUMENTS

| | | | |
|---|---|---|---|
| 4,076,698 | 2/1978 | Anderson et al. | 526/348.6 |
| 4,430,289 | 2/1984 | McKinney et al. | 264/564 |
| 4,770,912 | 9/1988 | Furrer et al. | 524/425 |
| 4,921,911 | 5/1990 | Shirodkar | 525/86 |
| 4,957,969 | 9/1990 | Shirodkar | 525/86 |
| 4,957,972 | 9/1990 | Shirodkar | 525/240 |
| 4,985,498 | 1/1991 | Shirodkar | 525/86 |
| 5,041,501 | 8/1991 | Shirodkar | 525/240 |
| 5,051,471 | 9/1991 | Shirodkar | 525/86 |
| 5,147,936 | 9/1992 | Peszkin et al. | 525/240 |
| 5,242,922 | 9/1993 | Shirodkar | 524/528 |

OTHER PUBLICATIONS

Ruiz et al., "Mineral Reinforcement of LLDPE Films", (Dec. 31, 1992) Tappi Journal, 76(1), 174–7.

Ling et al., "Mica–Filled PE Blown Film", (1991) Suliao, 20(3), 3–7, 47.

*Primary Examiner*—Cecilia J. Tsang
*Assistant Examiner*—Patrick R. Delaney
*Attorney, Agent, or Firm*—Jessica M. Sinnott

[57] ABSTRACT

Film forming blends, and films thereof, comprise copolymers of ethylene and alpha-olefins of 4 to 10 carbon atoms (LLDPE) containing up to about 35% of calcium carbonate exhibit excellent film impact properties which are sustained over time, without reduction in modulus or stiffness.

6 Claims, No Drawings

BLENDS OF CALCIUM CARBONATE AND LLDPE

This is a rule 62 continuation application of Ser. No. 08/153,852 now abandoned, filed Nov. 18, 1993.

FIELD OF THE INVENTION

The invention relates to novel compositions comprising a linear low density copolymer of ethylene and a an olefin containing 4 to 10 carbon atoms (LLDPE), and to films of improved properties formed from such compositions. Also included in the invention is the process of forming blown films from such compositions which results in films of improved impact strength, with retention of stiffness properties.

BACKGROUND OF THE INVENTION

Impact properties of film of linear low density polyethylene has been the subject of various patents in the literature, for example U.S. Pat. Nos. 4,743,649 and 4,957,969. Improvements in impact resistance of linear low density polyethylene has been described to result from blending linear low density polyethylene with impact polystyrene or impact poly(para-methylstyrene). Although the addition of impact polymers can improve impact properties of LLDPE film, the impact polymers, on addition to LLDPE, can reduce the stiffness (modulus) of the resulting film. In the literature, the use of microtalc has been described to act as an antiblocking agent in LLDPE production. However, such use of microtalc as an antiblocking agent has also been reported to result in decrease in impact properties of the resulting LLDPE film.

Various additives to increase impact strength of LLDPE do not have a sustained effect; that is, the initial effect of those impact strength enhancer additives tends to decrease as a function of time. Moreover, the impact strength enhancers tend to reduce stiffness properties of the product.

SUMMARY OF THE INVENTION

In accordance with the invention, the impact resistance of films of linear low density polyethylene is improved without blending the linear low density polyethylene with polymers, particularly without blending the linear low density polyethylene with impact polystyrene or impact poly(para-methylstyrene).

In accordance with this invention, novel polymer blends are provided comprising a major amount of a linear low density copolymer of ethylene with an olefin containing 4 to 10 carbon atoms (LLDPE), compounded with an amount of calcium carbonate effective to increase the impact resistance of films and to maintain that increase over time. In accordance with the invention, the calcium carbonate additive results in a LLDPE film of improved impact properties over that of the unmodified LLDPE. Moreover, the stiffness of the film is not affected by the addition of the calcium carbonate. The blends can be fabricated with equivalent or improved processability into blown films having improved impact properties.

DETAILED DESCRIPTION OF THE INVENTION

The linear low density ethylene copolymers (LLDPE) of this invention are linear copolymers of ethylene and a minor amount, preferably about 2 to 10 weight percent of an olefin, preferably a 1-olefin, containing 4 to 10 carbon atoms and having a density of about 0.9 to 0.94, preferably having a density of about 0.90 to about 0.93, a melting point of about 110° to 130° C., and a melt index of about 0.2 to 10. The preferred olefin comonomers are 1-butene, 1-hexene and 1-octene. The LLDPE may be prepared by any of various methods known in the art, e.g., by relatively low pressure methods as disclosed, for example, in U.S. Pat. No. 4,076,698 or by relatively high pressure methods, as disclosed, for example, in U.S. Pat. Nos. 4,405,774 and 4,530,983.

The calcium carbonate component of the blend of this invention comprises 0.5 to 35 wt % of the blend, preferably 2 to 25 wt % of the blend, and more preferably 5 to 20 wt % of the blend.

The blends of LLDPE and calcium carbonate may be prepared using any of various methods known in the art. For example, pellets of the two components may be dry blended and the blend added directly to a blown film extruder, e.g., a Sterling extruder or a Gloucester extruder, to produce films having a thickness, for example, of about 0.5 to 5 mils.

The blends of this invention contain a major amount, i.e., over 50 wt %, of the LLDPE and a minor amount, i.e., under 50 wt % of the calcium carbonate based on the total blend weight. The amount of the calcium carbonate is effective to increase the impact properties of the blend. Preferably, the blend contains about 0.5 to 35% of calcium carbonate, based on the total blend weight. More preferably, the blend contains about 2 to 25% of calcium carbonate, based on the total blend weight. Most preferably, in a LLDPE of 0.917 density the blend contains about 5 to 20% of calcium carbonate, based on the total blend weight.

The resulting blends of linear low density polyethylene and calcium carbonate, in film form, will exhibit improved (increased) impact properties without any addition of polymer other than the linear low density polyethylene. In the examples below, impact properties are reported as Dart Drop Impact, F50 grams. (ASTM D-1709). Morever, in addition to the improved impact properties, the blends of the invention do not exhibit decreased stiffness. This is surprising since improvements in impact properties of linear low density polyethylene realized by blending linear low density polyethylene with polymers, such as impact polystyrene or impact poly(para-methylstyrene), are normally associated with loss of stiffness due to the rubbery additives.

In addition to the LLDPE polymer component, the blend may also contain any of various additives conventionally added to polymer compositions for different purposes, e.g. stabilizers such as antioxidants, acid scavengers, pigments, etc.

The following examples further illustrate the invention.

EXAMPLES

A commercial "Super Strength" (sold by Mobil Corporation) LLDPE copolymer of hexene/ethylene copolymer with a 0.917 density and 0.9 g/10 min. MI was used in all experiments. The following samples were compounded on a Farrel mixer. In addition to the calcium carbonate, all samples contained a standard additive package consisting of antioxidants, acid scavengers, slip agent and antiblock. Data on a control with the above additive package but without calcium carbonate is also shown for comparison (Sample 4).

| Sample | Calcium carbonate; weight percent |
|--------|-----------------------------------|
| 1      | 5%                                |
| 2      | 15%                               |
| 3      | 0%                                |

Film samples were produced with the resins on a 3.5 inch Gloucester extruder at 2:1 BUR, 1.0 mil guage, 430 degrees F. melt temperature, and 250 lb/hr. Impact strength, in grams, as a function of time is shown below:

|        | Days after Film blowing | | | | | |
|--------|-----|-----|-----|-----|-----|-----|
| Sample | 0   | 5   | 7   | 12  | 19  | 32  |
| 1      | 695 | 640 | 615 | 645 | 605 | 585 |
| 2      | 655 | 680 | 545 | 635 | 615 | 675 |
| 3      | 655 | 400 | 370 | 330 | —   | 385 |

Thus it is apparent that there has been provided, in accordance with the invention, a blend, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for maintaining the numerical value of dart drop impact resistance of a copolymer of ethylene and an alpha olefin, said copolymer being linear low density polyethylene, having a dart drop impact resistance of at least about 655 grams, which over a period of 32 days will decrease to less than 655, wherein the process comprises blending the copolymer with 0.5 to 35 percent based on the total weight of the blend of reagent comprising calcium carbonate and maintaining the dart drop impact of the blended copolymer for at least 32 days.

2. The process of claim 1, wherein the percent ranges from 5 to 20.

3. The process of claim 1, wherein the percent is 15 percent.

4. The process of claim 1, wherein the calcium carbonate has an average particle size which ranges from 0.5 to 5.0 microns.

5. The process of claim 1, wherein the reagent is free of polymers and is free of rubber.

6. The process of claim 1, wherein the copolymer comprises a monomer selected from the group consisting of 1-butene, 1-hexene, and 1-octene.

* * * * *